T. MIDGLEY.
TIRE BEAD.
APPLICATION FILED JAN. 20, 1919.
1,349,902.
Patented Aug. 17, 1920.
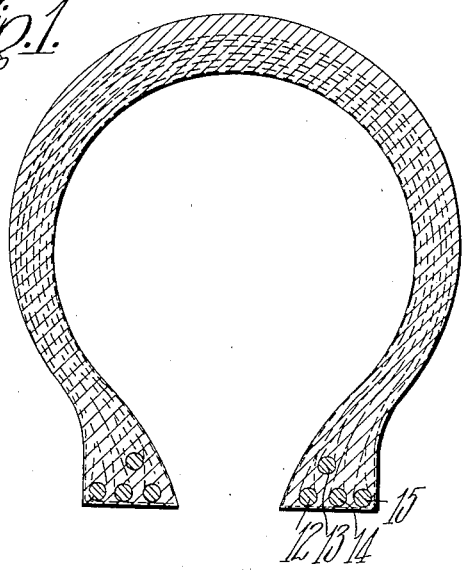
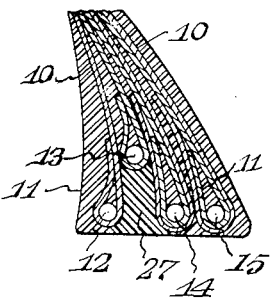
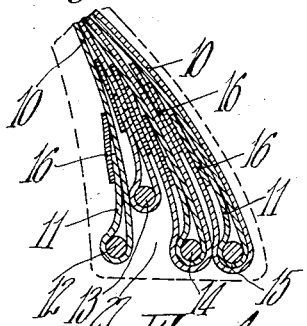
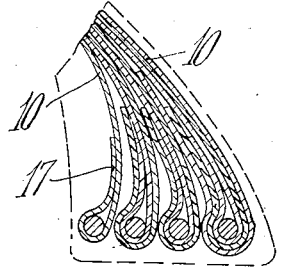
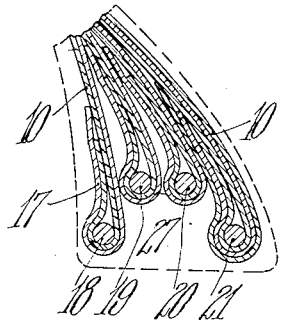
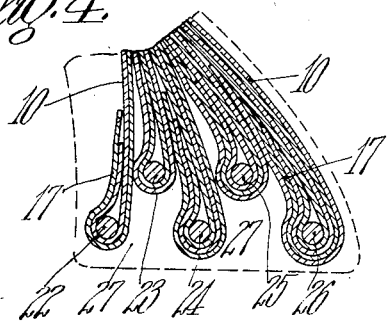
INVENTOR.
Thomas Midgley
BY Chapin & Neal
ATTORNEYS.

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BEAD.

1,349,902.    Specification of Letters Patent.    Patented Aug. 17, 1920.

Application filed January 20, 1919. Serial No. 272,107.

*To all whom it may concern:*

Be it known that I, THOMAS MIDGLEY, a citizen of the United States of America, residing at Springfield, in the county of Hampden and State of Massachusetts, have invented certain new and useful Improvements in Tire-Beads, of which the following is a specification.

My invention relates to the construction of the bead of large size pneumatic tire casings, and has for its object to give a proper form to the bead; to do away with the necessity of the ordinary pre-formed filler member; to provide against tilting upward of the inner toe of the bead; to provide a secure anchorage for the plies of fabric forming the tire casing; and to provide a rugged bead which will stand the shocks and strains incident to what are known as "giant" tires, designed primarily for use on motor trucks.

The invention has been shown as applied to "straight-side" tires, but it will be understood that it may be applied to beads of other shape.

In the accompanying drawings:

Figure 1 is a cross section of a tire casing showing digrammatically the plies of fabric and the anchoring members located in the bead;

Fig. 2 is a sectional detail of the fabric layers and anchoring members corresponding to those at the left in Fig. 1, showing a slightly different arrangement of anchoring members; the bead being shown diagrammatically in dotted outline;

Fig. 3 is a corresponding view showing a different arrangement of anchoring members and a different method of securing the fabric;

Fig. 4 is a corresponding view showing the invention applied to a somewhat heavier tire;

Fig. 5 is a corresponding view showing a slightly different method of accomplishing the same result; and Fig. 6 is a view similar to Fig. 2 omitting the flipper strips and showing the rubber in heavy shading.

Straight-side tires have an advantage over tires with other forms of bead in that the inwardly projecting toes provide an excellent seat for the inflated inner tube, and also in that the pressure of the latter tends to press the bead firmly into its seat on the rim. Trouble has been experienced, however, due to the inner toe of the bead tilting up slightly from the rim and allowing the tube to get under it, the resulting pinching frequently rupturing the tube. This has been to some extent overcome by the use of flaps or flexible liners which pass around the inner part of the casing over the beads and prevent the tube working down where pinching may result. Such flaps are bothersome and expensive, and the present invention is designed to give a straight-side bead which, among other advantages, will overcome these objections without need of using extra pieces such as flaps. This is accomplished, as described below, by giving sufficient body and rigidity to the toe of the bead to prevent its tilting or pulling up.

Another feature of this invention is the secure anchorage given to the layers of fabric forming the carcass of the tire. If the outer plies of fabric are anchored to the inner plies by folding them over a pre-formed filler member, as is the usual practice, the outer plies, which are subject to heavier stresses than the inner ones, will have an insecure anchorage, and the different plies will moreover share differently in taking up the shocks of the road. In my invention the casing is really composed of a number of concentric casings, of one or more plies of fabric, which are separately anchored in the bead of the tire. The several plies are thus stressed equally, no anchorage being subjected to undue strain, and injury to one ply will not affect the remaining ones. A tire constructed according to my invention has considerable advantage in strength over a tire made by folding all the plies over a single anchorage or filler, as is discussed further below.

A further advantage of my invention is that it does away with the necessity for the usual pre-formed filler member in the bead. In straight-side tires as previously constructed, it has been necessary, in order to give the proper shape to the bead, to employ a filler made up of a hard rubber or fabric body built into a more or less triangular form, in which the anchoring wires were embedded. Around this filler were folded the layers of fabric forming the carcass of the tire, and the whole was then vulcanized together. This construction was not suitable for large tires because of insufficient strength and because of poor anchorage of the fabric due to all the plies passing around the filler, and had many disadvantages even for the smaller sizes, being expensive, requiring additional time and labor in forming it, and not having sufficient strength near the toe to prevent the latter from pulling up. My invention accomplishes all the purposes and functions of this type of filler without its disadvantages. The anchoring members, having fabric folded around them, have considerable body, and in themselves shape the bead into proper form. They can be located wherever the stress on the tire makes additional strength necessary. In other words, the anchoring members in my invention serve three purposes; furnishing anchorage for the plies of fabric; giving strength and rigidity to the bead, and giving the bead the proper shape.

In forming a casing according to my invention the desired number of layers of fabric 10 are folded over the core and their side edges bent back on themselves as at 11 around reinforcing or anchoring members such as wires or cables 12, 13, 14, and 15, as illustrated in Figs. 1 and 2. The fabric edge thus bent back on itself may be fastened down by a narrow strip of fabric 16 which may be called a "flipper" strip, or may be merely cemented down as shown at 17 in Figs. 3, 4, and 5. The "flipper" strip method of construction has the advantage that it provides a more elastic fastening; and, where cord fabric (parallel cords held in a sheet of rubber) is used, has the further advantage that the cords will attach themselves much more securely to a woven fabric, like the flipper strip, than to a cord fabric.

In the construction illustrated in Figs. 1 and 2 anchoring member 13 is located higher in the bead than the other members. As used in this specification, the terms "higher," "upwardly," and the like, refer to the positions of the elements as they appear in the figures of the drawing. This gives a greater rigidity to the bead above its base line, both by the presence of the reinforcement and because of the filling out of the inner contour of the bead due to the thickness of the anchoring member and its attached folded fabric. The raising of this anchoring member also enables it to be placed rather nearer to the toe of the bead, if desired, as shown in Fig. 1, and effectually prevents, both by its position and the solidity given to the bead by the filling out mentioned above, any drawing up of the toe of the bead which might result in a pinching of the tube. In Fig. 2 the anchoring member 13 is shown as being located near the outside of the bead, which gives greater rigidity where the bead comes in contact with the rim.

In the construction of Fig. 3 additional rigidity is given that portion of the bead above the base by moving the center two of the four anchoring members 18, 19, 20 and 21 upwardly, the principle being the same as in Figs. 1 and 2. In this case there is a very considerable shaping or filling of the bead due to the location of the anchoring members.

In Fig. 4 five anchoring members are used they being placed in staggered relation, members 22, 24, and 26 being at the base while members 23 and 25 are in the upper part of the bead. This construction is suitable for very heavy tires.

The number of plies attached to each anchoring member is optional, but it is desirable in the larger sized tires that there should be a lesser number of plies attached to the anchoring members at the outside of the bead than to those members at the inside, as the outside layers of fabric are under a greater strain and will exert greater pull on the anchoring members to which they are attached.

In all these forms the spaces between the anchoring members may be filled in as with rubber 27, which is afterward vulcanized in with the main body of the tire. This rubber acts in addition to the anchoring members and fabric plies to separate the anchoring members and to build out the contour of the bead. The rubber has not been shown in these spaces, to avoid confusion, and the outline of the bead has been shown diagrammatically in Figs. 2, 3, 4, and 5 by a dotted line. It will readily be understood from the foregoing that the contour of the bead is determined by the anchoring members, the fabric anchored thereto, and the interposed filling of rubber; and not by the addition of pre-formed building-out material, as is the case in tire beads as usually constructed. It will further be noted that the bead is built up as an integral part of the casing, the several plies being anchored to several respective anchoring members, instead of being anchored to a pre-formed bead filler into which the reinforcement is incorporated before it is built into the casing.

In Fig. 5 the building out of the bead above the toe is accomplished solely by the use of a greater number of plies of fabric attached to the anchoring members near the inside of the tire, the additional thickness of the bent over portions of the fabric providing a much more firm and substantial toe to the bead than would be the case if the plies were equally distributed.

In heavy tires of this type the fabric used will usually be of the type known as "cord fabric," wherein a plurality of parallel cords are held in a sheet of rubber, but the invention is equally applicable to fabric of the ordinary type with both warp and weft.

Further, the anchoring members referred to may be either single strands of wire or stranded cable, or may be composed of any other suitable material, but in any event, it is to be understood that the anchoring members are circular substantially inextensible cables, wires, or strands to hold the bead diameter of the tire fixed and in proper position on the rim.

Having thus described my invention, I claim—

1. A tire bead comprising a plurality of anchoring members located adjacent the base of the bead, and an additional anchoring member located in staggered relation to the first mentioned members, said first-named members being separated a substantial amount at a point below the second-named member, whereby the contour of the bead is built out above the base thereof.

2. In a tire casing, a plurality of plies of fabric forming the body of the tire, a plurality of circumferentially disposed anchoring members for said plies, each anchoring member being located in the bead portion of the casing and being arranged to anchor some of the plies independently of the plies anchored by the other members, and filling material separate from the carcass-forming material interposed between adjacent anchoring members and the plies of fabric anchored thereby for separating the members and building out the contour of the bead, the contour of the bead being determined by the anchoring members, the fabric plies, and the interposed filling material.

3. In a tire casing, a plurality of inextensible anchoring members and plies of fabric folded around said members, each anchoring member being arranged to anchor the plies folded around it independently of the plies folded around the other members, and means to space some of the anchoring members apart from the others, some of said anchoring members being separated from each other in part by contact of adjacent folds of fabric and in part by said means, the bead form of the casing being determined by the anchoring members, the fabric plies, and said means.

4. In a tire casing, a plurality of inextensible anchoring members with plies of fabric folded around them, each anchoring member being arranged to anchor the plies folded around it independently of the plies folded around the other members, an anchoring member offset from the remaining anchoring members and being arranged to anchor additional plies of fabric independently of the plies anchored by the first-named members and acting also to separate certain of the first-named members, and means in addition to the offset member acting to separate some of the first-named members.

5. In a tire casing, a plurality of plies of fabric forming the body of the tire, a plurality of circumferentially disposed anchoring members for said plies, each anchoring member being arranged to anchor some of the plies independently of the plies anchored by the other members, said members being arranged in a series substantially transverse to the bead, and means acting in addition to one of the intermediate anchoring members and the fabric for maintaining two non-adjacent anchoring members separated.

6. In a pneumatic tire casing, a plurality of anchoring members located in the bead of the tire, and a plurality of plies of fabric folded around the anchoring members, at least one ply being folded around each anchoring member, the number of plies folded around a single member being greater toward the inner edge of the bead than toward the outer edge.

7. In a bead for a pneumatic tire casing of the type described, wherein a plurality of plies of fabric are passed over the crown of the casing and are anchored in the bead thereof by folding over anchoring members, each anchoring member having at least one ply folded therearound; that arrangement of plies and anchoring members in which the members are placed in staggered relation and a greater number of plies of fabric are folded over the members at the inside of the bead than over the members at the outside.

8. In a bead for a pneumatic tire casing, an anchoring member, a ply of fabric folded over such anchoring member, and a strip of fabric covering the joint between the main body of the ply and the folded over portion thereof, and attached to both the main body and the folded over portion of the ply.

THOMAS MIDGLEY.